US012782195B2

(12) United States Patent
Chen et al.

(10) Patent No.: US 12,782,195 B2
(45) Date of Patent: Nov. 3, 2026

(54) BREWSTER ANGLE WINDOWS FOR MULTI-PASS ABSORPTION SPECTROSCOPY

(71) Applicant: Applied Materials, Inc., Santa Clara, CA (US)

(72) Inventors: Timothy Chen, Los Altos, CA (US); Abdullah Zafar, Santa Clara, CA (US)

(73) Assignee: Applied Materials, Inc., Santa Clara, CA (US)

( * ) Notice: Subject to any disclaimer, the term of this patent is extended or adjusted under 35 U.S.C. 154(b) by 289 days.

(21) Appl. No.: 18/373,139

(22) Filed: Sep. 26, 2023

(65) Prior Publication Data

US 2025/0102873 A1 Mar. 27, 2025

(51) Int. Cl.
*G01J 3/447* (2006.01)

(52) U.S. Cl.
CPC .................................... *G01J 3/447* (2013.01)

(58) Field of Classification Search
CPC ........ G01J 3/42; G01J 3/10; G01J 3/02; G01J 2003/423; G01J 3/0218; G01J 3/433; G01J 9/04; G01J 3/44; G01J 3/0216; G01J 3/0224; G01J 3/0237; G01J 3/14; G01J 3/26; G01J 3/0202; G01J 3/0205; G01J 3/0291; G01J 3/0294; G01J 3/28; G01J 3/2803; G01J 3/0286; G01J 3/0208; G01J 3/4338; G01J 3/021; G01J 3/0232; G01J 3/457; G01J 3/0256; G01J 3/40; G01J 3/4406; G01J 3/45; G01J 9/0246;
(Continued)

(56) References Cited

U.S. PATENT DOCUMENTS 4,158,772 A * 6/1979 Reedy ................ G01N 21/3504 250/341.1
4,489,239 A * 12/1984 Grant ..................... G01N 21/39 250/338.5
(Continued)

FOREIGN PATENT DOCUMENTS

CN 107328737 A 11/2017
CN 207231993 U * 4/2018
(Continued)

OTHER PUBLICATIONS

Lefkowitz, Joseph K., "Species and temperature measurements of methane oxidation in a nanosecond repetitively pulsed discharge," Philosophical Transactions A, (2015) 373: 20140333. http://dx.doi.org/10.1098/rsta.2014.0333, 21 pages.
(Continued)

*Primary Examiner* — Michael P Stafira
(74) *Attorney, Agent, or Firm* — Schwabe, Williamson & Wyatt, P.C.

(57) ABSTRACT

Embodiments disclosed herein include an apparatus with a chamber with a first opening and a second opening. In an embodiment, a first window seals the first opening, and a first mirror is outside of the chamber. The first window and the first mirror are oriented in a non-parallel arrangement with each other. In an embodiment, a second window seals the second opening, and a second mirror is outside of the chamber. The second window and the second mirror are oriented in a non-parallel arrangement with each other, and wherein the first mirror is parallel to the second mirror.

18 Claims, 10 Drawing Sheets

(58) Field of Classification Search

CPC ....... G01J 2003/1213; G01J 2003/1221; G01J 2003/1234; G01J 2003/1282; G01J 2003/2869; G01J 3/0259; G01J 3/0262; G01J 3/0297; G01J 3/12; G01J 3/18; G01J 3/22; G01J 2003/2866; G01J 3/108; G01J 3/447; G01J 2003/1828; G01J 2003/4275; G01J 3/0229; G01J 3/0289; G01J 3/04; G01J 3/2889; G01J 3/32; G01J 3/427; G01J 4/04

See application file for complete search history.

(56) References Cited

U.S. PATENT DOCUMENTS

| | | | | | |
|---|---|---|---|---|---|
| 5,572,031 | A * | 11/1996 | Cooper | G01D 3/0365 | 250/351 |
| 6,452,680 | B1 * | 9/2002 | Paldus | G01N 21/39 | 250/343 |
| 2003/0063284 | A1 | 4/2003 | McAndrew et al. | | |
| 2003/0107739 | A1 * | 6/2003 | Lehmann | G01N 21/39 | 356/437 |
| 2006/0123884 | A1 * | 6/2006 | Selker | G01N 21/1702 | 73/24.02 |
| 2007/0195434 | A1 * | 8/2007 | Koulikov | G01N 21/39 | 359/809 |
| 2007/0242720 | A1 * | 10/2007 | Eckles | G01N 33/0047 | 372/107 |
| 2016/0294146 | A1 | 10/2016 | Tsia et al. | | |
| 2017/0146451 | A1 * | 5/2017 | Chanda | G01N 21/0332 | |
| 2018/0024051 | A1 * | 1/2018 | Zemek | G01J 3/10 | 356/409 |
| 2024/0410755 | A1 * | 12/2024 | Leen | G01J 3/42 | |

FOREIGN PATENT DOCUMENTS

| | | | | | |
|---|---|---|---|---|---|
| CN | 109579982 | A | * | 4/2019 | G01J 1/0466 |
| CN | 107941736 | B | * | 9/2020 | G01N 21/01 |
| CN | 117147493 | A | * | 12/2023 | G01N 21/39 |
| DE | 112015005303 | B4 | * | 5/2022 | B08B 17/02 |
| EP | 3287767 | A1 | * | 2/2018 | G01N 21/3504 |
| JP | 2006041092 | A | * | 2/2006 | |
| KR | 1020080028985 | A | | 4/2008 | |
| TW | 202321674 | A | | 6/2023 | |

OTHER PUBLICATIONS

Ma, Jie, "Probing the plasma chemistry in a microwave reactor used for diamond chemical vapor deposition by cavity ring down spectroscopy," Journal of Applied Physics 104, 103305 (2008), 10 pages.

International Search Report and Written Opinion from PCT Application No. PCT/US2024/037847, dated Nov. 1, 2024, 9 pages.

International Preliminary Report on Patentability from PCT/US2024/037847 dated Apr. 9, 2026, 6 pgs.

Official Letter from Taiwan Patent Application No. 113135382 dated Apr. 29, 2026, 14 pgs.

* cited by examiner

BREWSTER ANGLE WINDOWS FOR MULTI-PASS ABSORPTION SPECTROSCOPY

BACKGROUND

1) Field

Embodiments relate to the field of absorption spectroscopy, and more particularly, to the application of absorption spectroscopy in relation to semiconductor manufacturing environments.

2) Description of Related Art

Absorption spectroscopy is an analytical technique that can be used in order to detect the presence or absence of elemental species or other substances in a sample. Generally, electromagnetic radiation is emitted so that it interacts with the sample. A detector is used to measure the absorption of electromagnetic radiation after it has interacted with the sample. In order to provide enhanced signal strength, the absorption spectroscopy system may be set up so that the electromagnetic radiation passes through the sample multiple times. For example, mirrors can be used to reflect the electromagnetic radiation through the sample any number of times. This enables the detection of low-concentration components in the sample. Measurement systems with this type of setup may sometimes be referred to as being multi-pass absorption spectroscopy tools.

SUMMARY

Embodiments disclosed herein include an apparatus with a chamber with a first opening and a second opening. In an embodiment, a first window seals the first opening, and a first mirror is outside of the chamber. The first window and the first mirror are oriented in a non-parallel arrangement with each other. In an embodiment, a second window seals the second opening, and a second mirror is outside of the chamber. The second window and the second mirror are oriented in a non-parallel arrangement with each other, and wherein the first mirror is parallel to the second mirror.

Embodiments may also include an apparatus comprising a chamber and an absorption spectroscopy system configured to take measurements within the chamber. In an embodiment, the absorption spectroscopy system comprises, a first mirror outside of the chamber, and a second mirror outside of the chamber.

Embodiments may also include an apparatus comprising a vacuum chamber with a first window and a second window. In an embodiment, an optical path between the first window and the second window passes through a volume of the chamber. In an embodiment, a first mirror and a second mirror are outside of the vacuum chamber. The first mirror and the second mirror are configured to reflect light along the optical path through the volume of the chamber. In an embodiment, faces of the first window and the second window are non-parallel with faces of the first mirror and the second mirror.

DETAILED DESCRIPTION

Figure 1A:
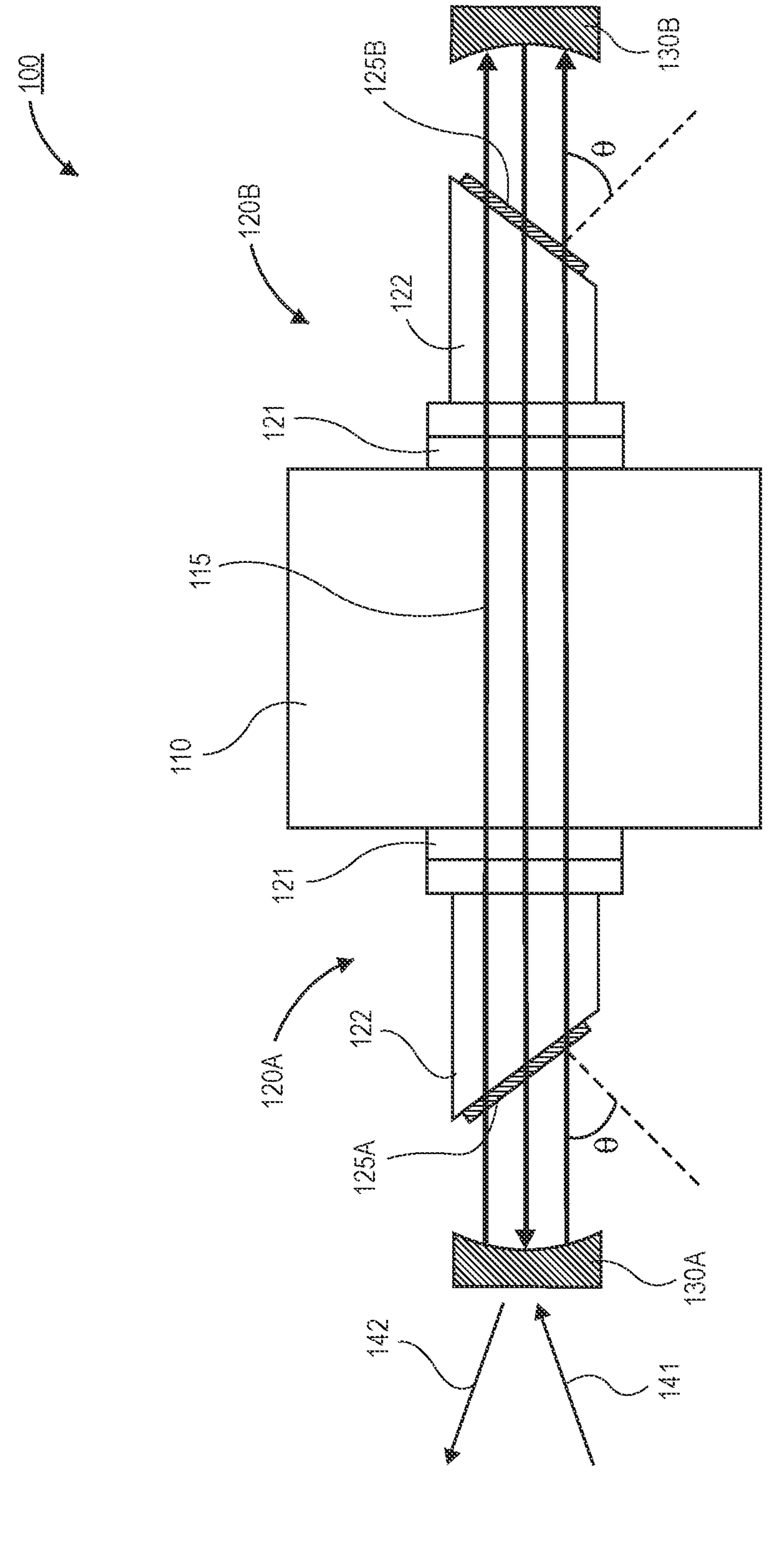
FIG. 1A is a cross-sectional illustration of a multi-pass absorption spectroscopy tool that is integrated with a chamber, in accordance with an embodiment.

Systems described herein include multi-pass absorption spectroscopy tools for use in semiconductor manufacturing environments. In the following description, numerous specific details are set forth in order to provide a thorough understanding of embodiments. It will be apparent to one skilled in the art that embodiments may be practiced without these specific details. In other instances, well-known aspects are not described in detail in order to not unnecessarily obscure embodiments. Furthermore, it is to be understood that the various embodiments shown in the accompanying drawings are illustrative representations and are not necessarily drawn to scale.

As noted above, multi-pass absorption spectroscopy tools are useful for detecting elements and other chemical compounds that have low concentrations in a sample. This is particularly beneficial for semiconductor manufacturing applications. The precise knowledge of the chemical composition within a semiconductor processing environment allows for enhanced process control, better yields, higher throughput, and the like. However, existing multi-pass absorption spectroscopy tools are difficult to integrate into semiconductor processing equipment for several reasons.

One reason is that environments within the chambers of the semiconductor processing tools are typically harsh. Chemicals used to process semiconductors (e.g., through etching, deposition, annealing, etc.) can damage the structures of the spectroscopy tool. For example, mirror coatings and surfaces are typically attacked by corrosive elements and conditions. As such, the reflectivity of the mirrors rapidly degrades, and the system becomes unusable.

An alternative approach is to move the mirrors outside of the chamber. In such instances, the electromagnetic radiation passes through windows in the chamber. However, each pass through the window results in a decrease in the signal strength due to non-perfect transmittance through the window. This is largely due to different refractive indices at the interfaces of the window along the optical path. Accordingly, the strength of the signal rapidly decays and the output signal is too weak to be useful. This is particularly problematic when the electromagnetic radiation makes more than 10 passes, more than 20 passes, or more than 30 passes through the chamber.

Accordingly, embodiments disclosed herein enable high efficiency multi-pass absorption spectroscopy in semiconductor manufacturing environments. In some embodiments, this may be done by: 1) providing the multi-pass mirrors outside of the harsh chamber environment; and 2) orienting the mirrors and the windows so that the optical path passes through the windows at (or around) the Brewster's angle. In the case of p-polarized light, when the light has an angle of incidence that is equal to the Brewster's angle, the light will pass through the interface without any reflection. That is, the signal strength is not significantly impacted by passing back and forth through the chamber multiple times. This allows for strong signal generation to determine low concentration species within a semiconductor processing tool.

In one embodiment, the optical path passes substantially horizontally through the chamber. That is, the optical path may be substantially orthogonal to a vertical sidewall of the chamber. In such an embodiment, the windows may be angled relative to the sidewalls of the chamber. The angled windows may be held in place by mounting structures designed to properly orient the windows. The two windows (which may be on opposite sides of the chamber) may have the same orientation, or the two windows may have orientations that are mirror images of each other.

In another embodiment, the optical path may pass non-horizontally through the chamber. For example, a first window may be at a first height on a sidewall of the chamber, and a second window may be at a second height on the sidewall of the chamber. The first window and the second window may be parallel to the sidewall of the chamber. In order to provide the proper angle between the optical path and the windows, the mirrors may be angled relative to the sidewall of the chamber.

In yet another embodiment, both the windows and the mirrors may be angled with respect to the sidewall of the chamber. In such an embodiment, the optical path through the chamber may not be horizontal. Further, the mirrors will still have an angular offset with respect to the windows. Such an embodiment may be useful to decrease the vertical offset between the first window and the second window.

In embodiments described herein, the phrase "optical path" may be used in relation to various concepts. An optical path may refer to the path of light between two objects. At the lengths and conditions generally experienced in semiconductor tools, the optical path may be considered as being substantially straight or linear. Further, in the case of the path of light reflecting between two opposing concave mirrors (e.g., in a multi-pass configuration), the true optical path may not be a single line of light between the two mirrors. Instead, the true optical path in such a configuration may include the ray tracing of each reflection between the mirrors. Due to the concave nature of the mirrors, the reflected light may not be parallel to the principal axis of the mirrors. However, for simplicity, the orientation of the optical path between multi-pass mirrors may generally be defined as being the same orientation as the principal axis of the multi-pass mirrors.

Generally, embodiments may include any suitable multi-pass mirror setup in order to provide a desired number of passes through the chamber volume. One particular multi-pass mirror architecture that has been shown to be a suitable candidate is a Herriott cell. In such an embodiment, two opposing spherical mirrors with a hole machined through a center of one or both mirrors can be used to reflect the light back and forth. The number of reflections can be controlled by adjusting the distance between the mirrors in some embodiments. Embodiments disclosed herein may include 10 or more reflections, 20 or more reflections, or 30 or more reflections. Though, fewer than 10 reflections may also be used in some instances.

Embodiments disclosed herein may include multi-pass absorption spectrometers that are integrated with semiconductor processing tools. For example, the semiconductor processing tools may include vacuum chambers (or sub-atmospheric pressure chambers) that are used for any processing operation typical of semiconductor manufacturing. For example, chambers may be used for annealing processes, deposition processes (e.g., physical vapor deposition (PVD), chemical vapor deposition (CVD), atomic layer deposition (ALD)), etching processes, and the like. While semiconductor tools are one application of embodiments disclosed herein, embodiments are not limited to such applications. For example, any tool with a chamber that includes an internal volume that is not compatible with the placement of mirrors inside the chamber may benefit from architectures described herein. That is, tools that may use embodiments disclosed herein may also include chambers with environments that are not compatible with the mirrors, chambers with geometry and/or space limitations that cannot accommodate the mirrors, and the like.

Referring now to FIG. 1A, a cross-sectional illustration of a tool 100 is shown, in accordance with an embodiment. In an embodiment, the tool 100 may comprise a chamber 110. The chamber 110 may be a sub-atmospheric chamber, such as a vacuum chamber. The chamber 110 may be used for semiconductor manufacturing processes including, but not limited to, annealing, deposition, and etching processes.

In an embodiment, the chamber 110 may have openings along walls that are closed by window assemblies 120A and 120B. The window assemblies 120A and 120B may be positioned on opposite sides of the chamber 110. The window assemblies 120A and 120B may be provided at about the same height along sidewalls of the chamber 110. In an embodiment, the window assemblies 120A and 120B may each include a seal 121 and a window support 122.

The seal 121 may include a seal ring, such as an O-ring or other compressible sealing structure capable of providing a vacuum tight seal. The seal 121 may also include a collar or other solid structure that presses against the O-ring. The collar of the seal 121 may be secured to the chamber 110 through bolts or any other suitable fastener device.

The window support 122 may be a mechanical structure that extends the window 125A or 125B away from the sidewall of the chamber 110. The window support 122 may have an internal volume that is fluidically coupled to the interior volume of the chamber 110 through the opening in the chamber 110. The window support 122 may comprise stainless steel, or any other suitable material capable of supporting the vacuum pressures of the tool 100.

The window support 122 may also provide an angled surface in order to mount the window 125A or 125B at an angle with respect to a vertical sidewall of the chamber 110. The angle of the windows 125A and 125B may result in the windows 125A and 125B being at an angle θ with respect to the optical path 115. The angle θ may have a range that includes the Brewster's angle, which allows for propagation through the windows 125A and 125B without losses due to reflection. The angle θ may be between 45° and 80°, or between 55° and 60°. Though, any angle θ away from normal may be used to reduce the amount of reflection.

In the embodiment shown in FIG. 1A, the window assembly 120A is a mirror image of the window assembly 120B. That is, the window 125A is held at an angle that is a mirror image of the angle of the window 125B. However, embodiments are not limited to such configurations. For example, the window supports 122 for the window assemblies 120 may be non-uniform. As an example, window support 122 for window assembly 120A may be longer than the window support 122 for window assembly 120B. Despite the lengths being different, the angles for supporting the windows 125A and 125B may still be mirror images of each other in some embodiments.

In an embodiment, the windows 125A and 125B may be any suitable material that is substantially optically clear. The material for the windows 125A and 125B may also be chemically resistant to the processes within the chamber, since the interior of the windows 125A and 125B will be exposed to the chamber environment. For example, the windows 125A and 125B may be sapphire or the like. Coatings, such as anti-reflective coatings, may also be provided on the interior and/or exterior surfaces of the windows 125A and 125B.

In an embodiment, a pair of mirrors 130A and 130B may be provided outside of the chamber 110. The mirrors 130A and 130B may be oriented so that the principal axis for each mirror 130 is substantially orthogonal to the sidewall of the chamber 110. As such, the optical path 115 may pass horizontally (or substantially horizontally) through the interior of the chamber 110. Each of the mirrors 130A and 130B may be concave mirrors that allow for multi-pass reflections before exiting the system. In a particular embodiment, the mirrors 130A and 130B form a Herriot cell. The number of reflections between the mirrors 130A and 130B may be 10 or more reflections, 20 or more reflections, or 30 or more reflections. Though, fewer than 10 reflections may also be used in some embodiments. The mirrors 130A and 130B may have any suitable reflective material. In some instances, a high reflectivity coating, such as gold, may also be applied over the reflective surfaces of the mirrors 130A and 130B.

In an embodiment, the electromagnetic radiation propagated through the system may be from a multi-wavelength light source or from a single wavelength light source (e.g., a laser). In order to benefit from the Brewster's angle arrangement, the electromagnetic radiation may be polarized. In the illustrated embodiment, the electromagnetic radiation has an input 141 and an output 142 that both pass through the first mirror 130A. As will be described in greater detail below, the first mirror 130A may have a hole (e.g., at the center of the first mirror 130A) that allows for the light to pass into and out of the system.

Figure 1B:
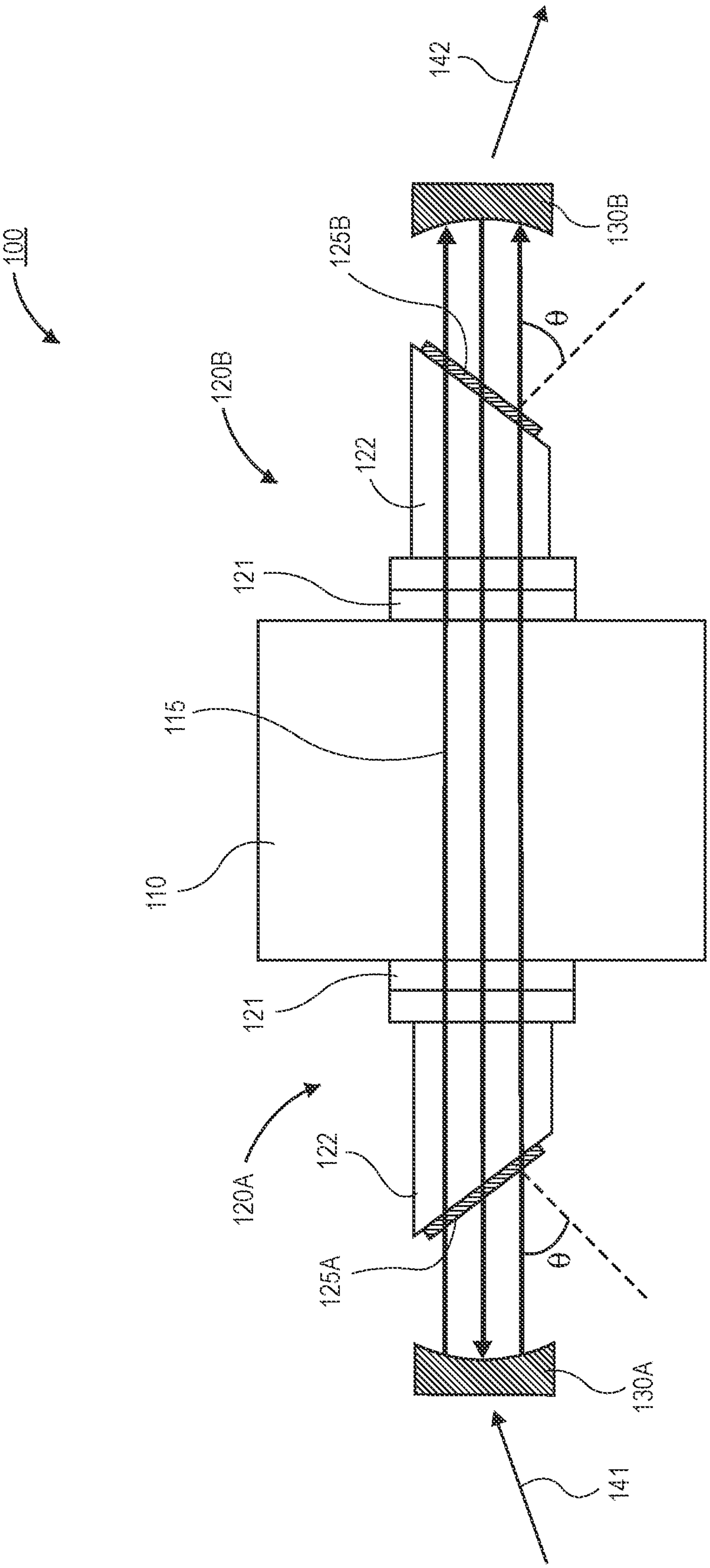
FIG. 1B is a cross-sectional illustration of a multi-pass absorption spectroscopy tool with an input and an output on opposite sides of the chamber, in accordance with an embodiment.

Referring now to FIG. 1B, a cross-sectional illustration of a tool 100 is shown, in accordance with an additional embodiment. In an embodiment, the tool 100 in FIG. 1B is substantially similar to the tool 100 in FIG. 1A, with the exception of the input 141 and output 142 locations of the optical system. Instead of both the input 141 and the output 142 being at the same mirror 130A, the input 141 is provided at the first mirror 130A, and the output is provided at the second mirror 130B. Separating the input 141 from the output 142 may allow for easier integration of the optics as opposed to providing both the input optics chain and the output optics chain within the same region of the tool 100.

The input 141 can be separated from the output 142 by modifying the locations of the mirrors 130A and 130B with respect to each other. For example, increasing or decreasing the distance between the mirrors 130A and 130B can change which mirror 130A or 130B that the output 142 comes from. Changing the curvature of the mirrors 130A and 130B may also separate the input 141 from the output 142.

In the case of the input 141 and the output 142 being on separate sides of the tool 100, both mirrors 130A and 130B need to have a hole. The first mirror 130A has a hole to allow light to enter the system, and the second mirror 130B has a hole to allow light to exit the system. In some embodiments, the first mirror 130A may be substantially similar to the second mirror 130B.

Figure 2:
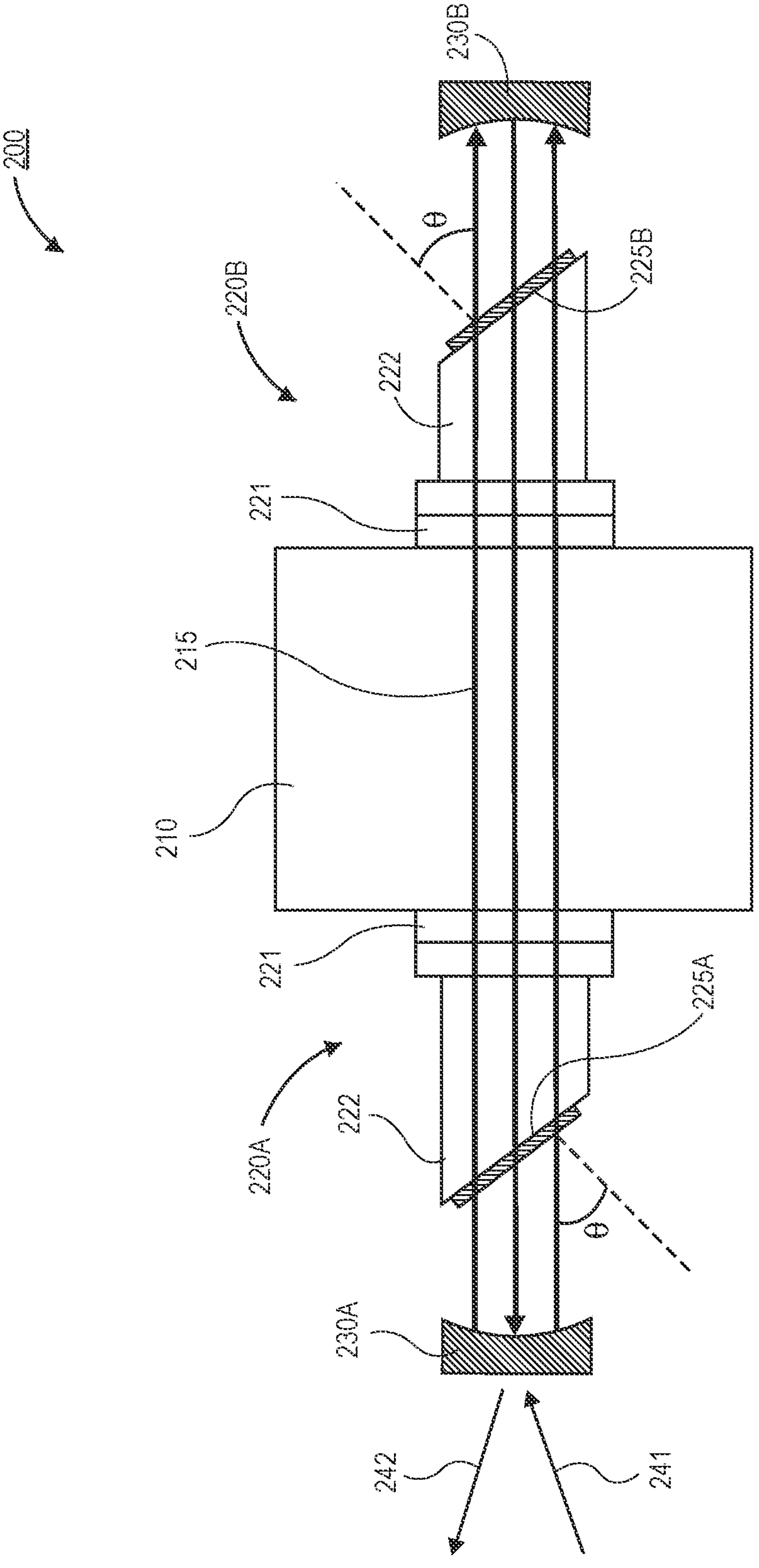
FIG. 2 is a cross-sectional illustration of a multi-pass absorption spectroscopy tool with a first window that is parallel to a second window, in accordance with an embodiment.

Referring now to FIG. 2, a cross-sectional illustration of a tool 200 is shown, in accordance with an additional embodiment. In an embodiment, the tool 200 may comprise a chamber 210. The chamber 210 may include openings that are covered by a pair of window assemblies 220A and 220B. In an embodiment, the window assembles 220A and 220B may each include a seal 221, a window support 222, and a window 225A or 225B. The chamber 210 and the window assemblies 220A and 220B may be similar to those described above with respect to FIGS. 1A and 1B, with the exception of the orientation of the window supports 222 and the windows 225A and 225B.

Instead of being a mirror image of each other, the windows 225A and 225B are oriented so that they are substantially parallel to each other. Since the two windows 225A and 225B are parallel to each other, the angles θ of the optical path 215 relative to the normals of the windows 225A and 225B are both the same. Accordingly, there is minimal (if any) reflection of the electromagnetic radiation as the electromagnetic radiation propagates between the first mirror 230A and the second mirror 230B when the angle θ is at or around the Brewster's angle.

In the illustrated embodiment, the input 241 into the system and the output 242 from the system are shown as passing through the first mirror 230A. However, it is to be appreciated that a tool 200 with a similar architecture can also be designed so that the input 241 and the output 242 pass through different mirrors 230, similar to the embodiment shown in FIG. 1B.

Figure 3:
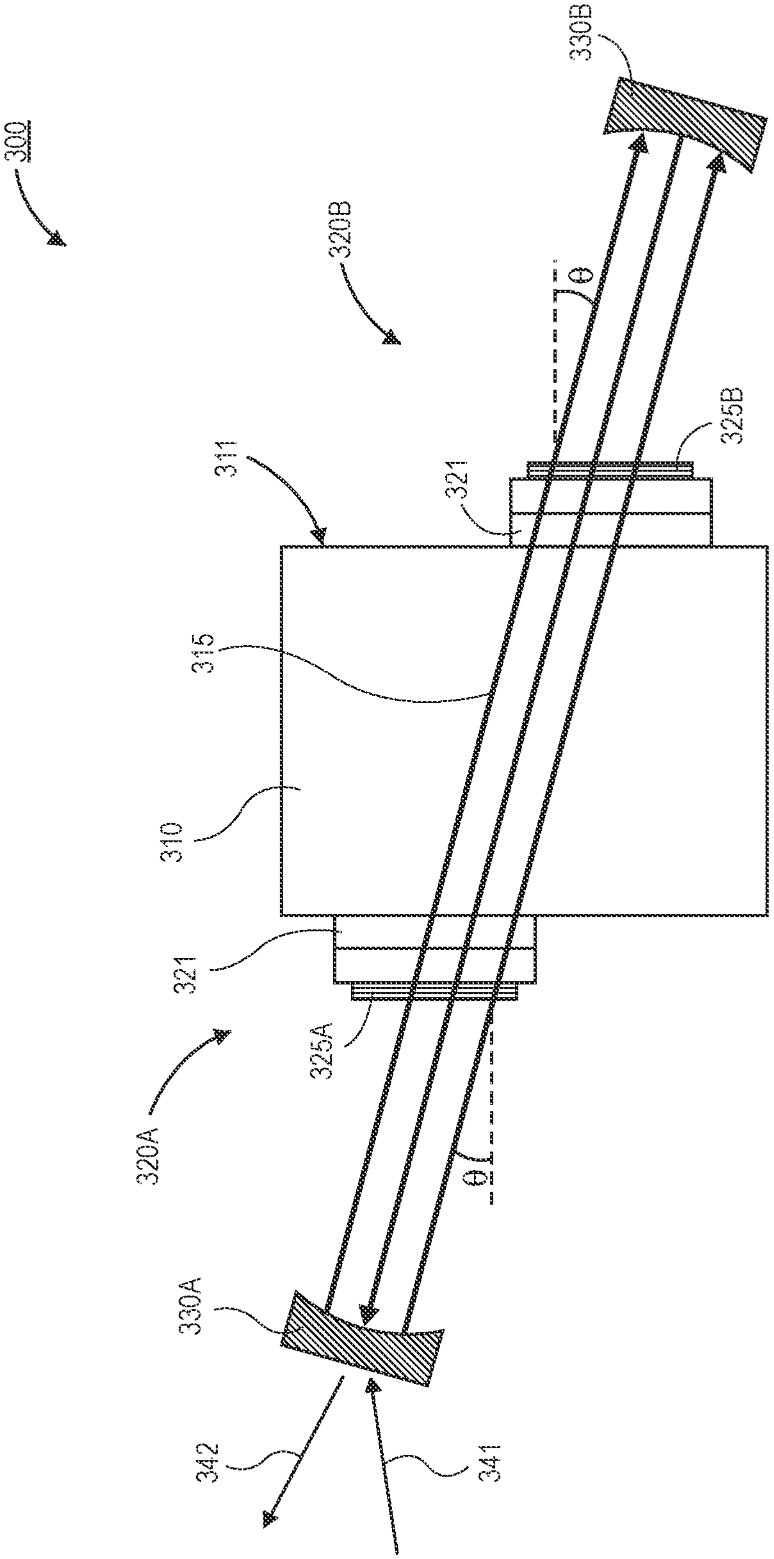
FIG. 3 is a cross-sectional illustration of a multi-pass absorption spectroscopy tool with mirrors that are angled with respect to vertical windows in the chamber, in accordance with an embodiment.

Referring now to FIG. 3, a cross-sectional illustration of a tool 300 is shown, in accordance with an additional embodiment. In an embodiment, the tool 300 comprises a chamber 310. In an embodiment, window assemblies 320A and 320B are provided over openings in the sidewall of the chamber 310. The window assemblies 320A and 320B may both comprise a seal 321 and a window 325A or 325B. As opposed to the embodiments described in greater detail above, the windows 325A and 325B may be oriented substantially parallel to the sidewalls 311 of the chamber 310. That is, in some embodiments, a window support that angles the windows relative to the chamber 310 is not necessary.

In order to provide the necessary angle θ relative to the optical path 315, the mirrors 330A and 330B are angled relative to the chamber sidewalls 311. Angling the mirrors 330A and 330B may result in the optical path 315 being non-horizontal through the chamber 310. To account for this type of optical path 315, the windows 325A and 325B may be vertically offset from each other. For example, the first window 325A may be closer to the top of the chamber 310, and the second window 325B may be closer to the bottom of the chamber 310. The amount of offset that is necessary for the windows 325A and 325B may be dependent (at least in part) on the dimensions of the chamber 310 and the angle of the optical path 315. Such an embodiment may be beneficial when there is not enough room for horizontal window supports to enable angling the windows 325, or if a simplified chamber 310 structure is desired.

Figure 4:
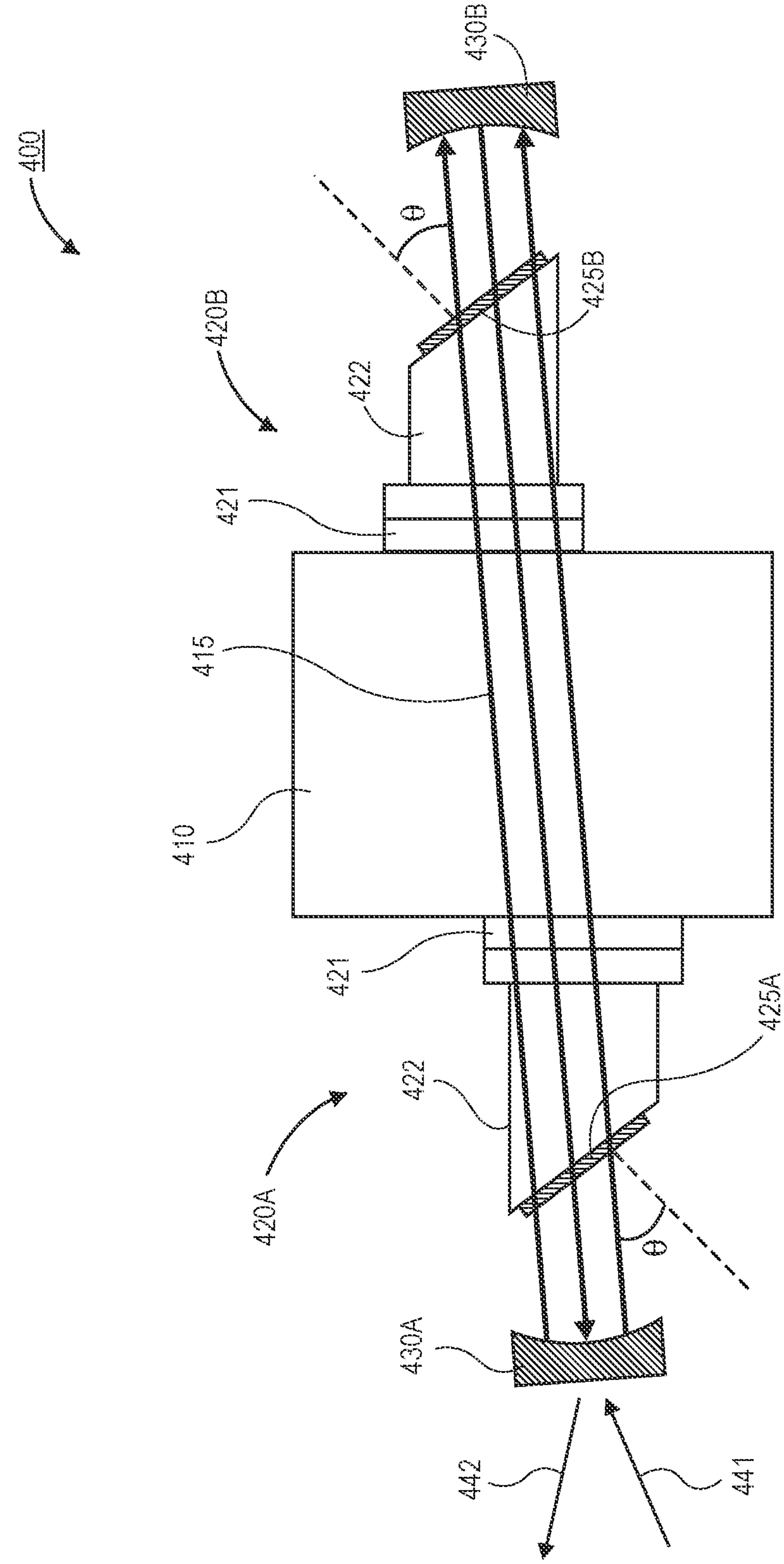
FIG. 4 is a cross-sectional illustration of a multi-pass absorption spectroscopy tool with mirrors and windows that are all non-parallel with sidewalls of the chamber, in accordance with an embodiment.

Referring now to FIG. 4, a cross-sectional illustration of a tool 400 is shown, in accordance with an embodiment. The tool 400 may comprise a chamber 410. Chamber 410 may be similar to any of the chambers described in greater detail above. In an embodiment, openings along sidewalls of the chamber 410 may be covered by window assemblies 420A and 420B. The window assemblies 420A and 420B may each comprise a seal 421, a window support 422, and a window 425A or 425B. In an embodiment, the window supports 422 support the windows 425A and 425B at angles relative to the sidewall of the chamber 410. In the illustrated embodiment, the windows 425A and 425B are oriented so that they are parallel to each other. In other embodiments, the window 425A may be oriented at an angle that is the mirror image of the angle of window 425B.

In an embodiment, the mirrors 430A and 430B outside of the chamber 410 may also be angled relative to the sidewalls of the chamber 410. The angle of the mirrors 410 may result in an optical path 415 that is non-horizontal through the chamber 415. In some embodiments, the combined angles of the mirrors 430A and 430B and the windows 425A and 425B may result in the optical path 415 having an angle θ relative to the normal of the windows 425A and 425B that is at or around the Brewster's angle. This allows for the reflections to be minimized or eliminated, and the optical signal strength is improved. As shown, the input 441 and the output 442 both pass through the first mirror 430A. However, it is to be appreciated that the input 441 and the output 442 may be provided on opposite mirrors 430 in some embodiments.

As shown in the above described embodiments, the Brewster's angle architecture to enable low (or no) reflection multi-pass absorption spectroscopy can be obtained through different solutions. A first solution includes angling the windows while the mirrors are parallel to the sidewalls of the chamber. A second solution involves angling the mirrors while the windows are parallel to the sidewalls of the chamber. A third solution includes angling both the mirrors and the windows relative to the sidewalls of the chamber.

Figure 5A:
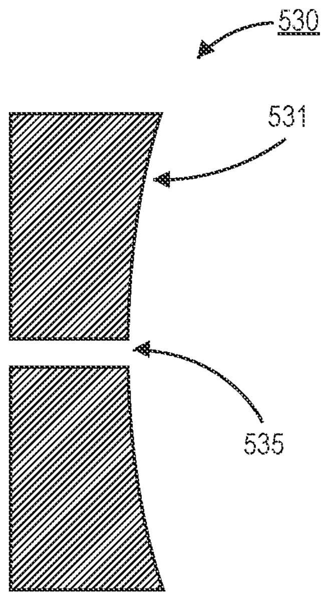
FIG. 5A is a cross-sectional illustration of a mirror with a hole that can be used for a multi-pass absorption spectroscopy tool, in accordance with an embodiment.

Referring now to FIG. 5A, a cross-sectional illustration of a mirror 530 is shown, in accordance with an embodiment. In an embodiment, the mirror 530 may be any suitable mirror structure. For example, the mirror 530 may have a glass substrate with a mirror coating, such as aluminum or the like. The mirror 530 may have a curved surface 531. The surface 531 may have any suitable curvature (e.g., spherical, parabolic, etc.) that is suitable for multi-pass cells. The mirror 530 may be a concave mirror 530.

In an embodiment, the mirror 530 may include a hole 535. The hole 535 passes through a thickness of the mirror 530 in order to allow light to pass into and out of the multi-pass cell. The hole 535 can be any suitable diameter. The hole 535 can be drilled with a mechanical drilling process, an etching process, or the like.

Figure 5B:
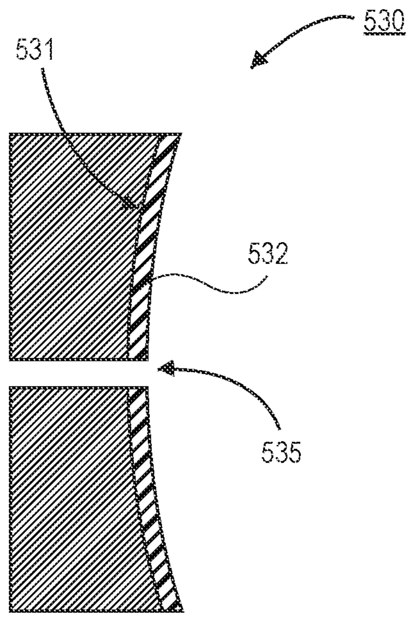
FIG. 5B is a cross-sectional illustration of a mirror with a high reflectivity coating, in accordance with an embodiment.

Referring now to FIG. 5B, a cross-sectional illustration of a mirror 530 is shown, in accordance with an additional embodiment. The mirror 530 in FIG. 5B may be similar to the mirror 530 in FIG. 5A, with the exception of the addition of a coating 532. The coating 532 may be provided on the curved surface of the mirror 530. The coating 532 may be a high reflectivity material (or materials) in order to improve the efficiency of the multi-pass optical system. For example, the coating 532 may include aluminum, silver, gold, a dielectric coating, or the like.

Figure 6A:
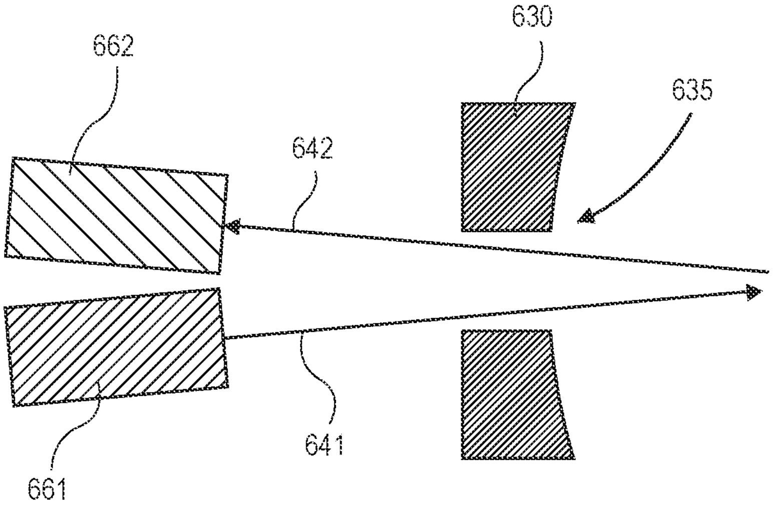
FIG. 6A is a cross-sectional illustration depicting the input and output lanes for a multi-pass absorption spectroscopy tool, in accordance with an embodiment.

Referring now to FIG. 6A, a cross-sectional illustration of one side of a multi-pass optical system is shown, in accordance with an embodiment. The illustrated embodiment includes a mirror 630 with a hole 635. The mirror 630 may be similar to any of the mirrors described in greater detail herein. In an embodiment, an optical input 641 initiates at a light source 661. The light source 661 may be any suitable light source, such as a laser, a multi-wavelength source, or the like. In order to obtain the benefits of the Brewster's angle orientations, the light source 661 may be a polarized light source 661.

In an embodiment, the optical input 641 passes through the hole 635 and enters the multi-pass optical system. Upon making the desired number of reflections, an optical output 642 passes back through the hole 635. The optical output 642 is routed to a detector 662. The detector 662 can be any type of device capable of measuring the absorption of the optical output 642, such as a photodiode device or the like. In the illustrated embodiment, both the detector 662 and the light source 661 are on the same side of the multi-pass cell. Though, as described in greater detail above, the detector 662 and the light source 661 may be on opposite sides of the multi-pass cell.

Figure 6B:
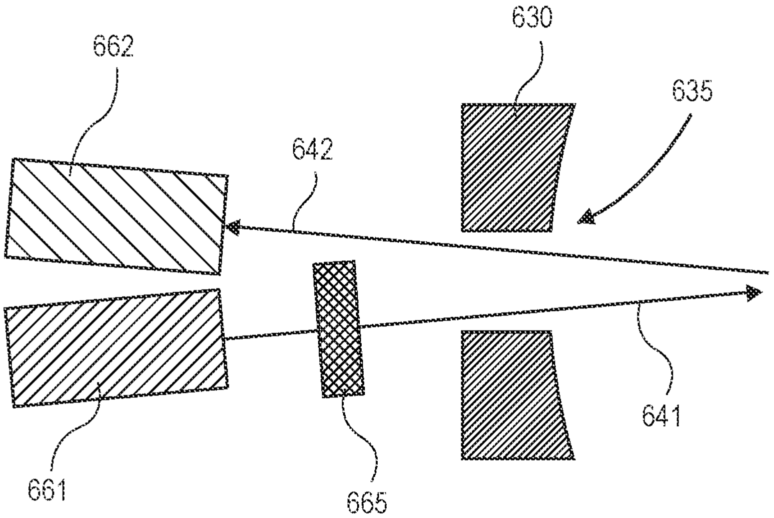
FIG. 6B is a cross-sectional illustration depicting an input laser and a polarizer for a multi-pass absorption spectroscopy tool, in accordance with an embodiment.

Referring now to FIG. 6B, a cross-sectional illustration of a portion of a multi-pass cell is shown, in accordance with an additional embodiment. In an embodiment, the structure in FIG. 6B is similar to that of FIG. 6A, with the addition of a polarizer 665. The polarizer 665 may be provided between the light source 661 and the mirror 630. A wave plate (not shown) may also be used to align the polarization. The optical input 641 may pass through the polarizer 665 in order to become polarized. Such an embodiment allows for the light source 661 to be a non-polarized light source 661.

Figure 6C:
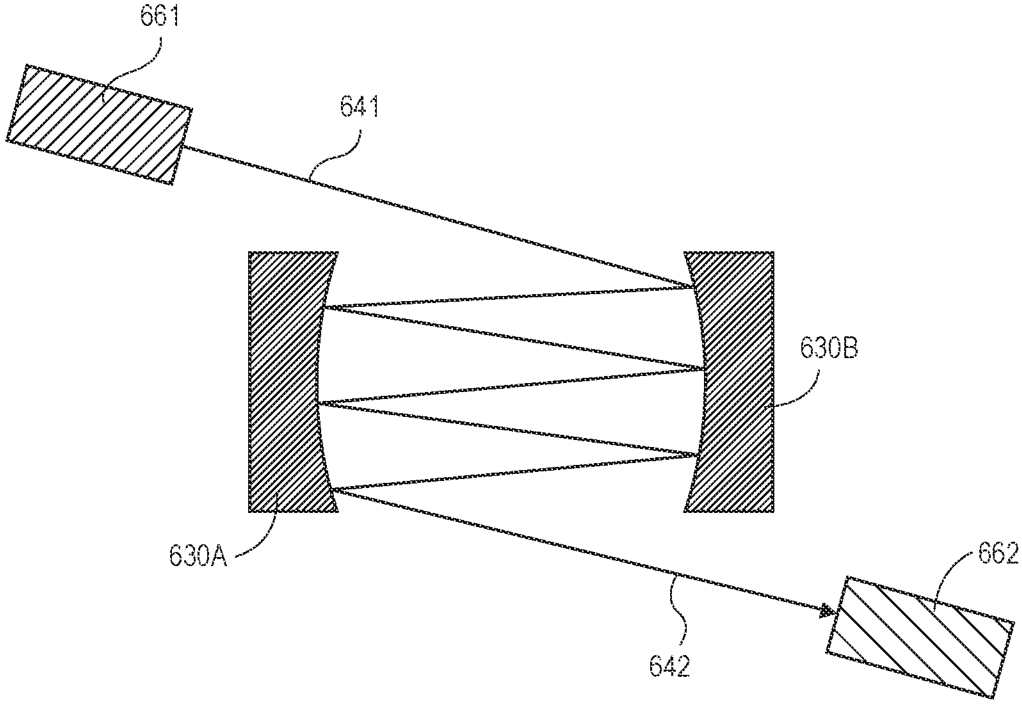
FIG. 6C is a cross-sectional illustration depicting an input laser and a detector with an optical path that passes around outer edges of the reflecting mirrors, in accordance with an embodiment.

Referring now to FIG. 6C, a cross-sectional illustration of a portion of a multi-pass cell is shown, in accordance with an additional embodiment. In an embodiment, a first mirror 630A and a second mirror 630B are shown opposing each other. A chamber (not shown) with windows oriented at (or around) the Brewster's angle relative to the mirrors 630 may be provided between the first mirror 630A and the second mirror 630B.

As shown, the optical path between the light source 661 and the detector 662 may enter and/or exit the multi-pass cell around the outer perimeters of the first mirror 630A and the second mirror 630B. For example, the optical input 641 from the light source 661 passes adjacent to an outer edge of the first mirror 630A, and the optical output 642 to the detector 662 passes adjacent to an outer edge of the second mirror 630B. Any number of reflections (which pass through the chamber) may be provided between the first mirror 630A and the second mirror 630B.

Figure 7:
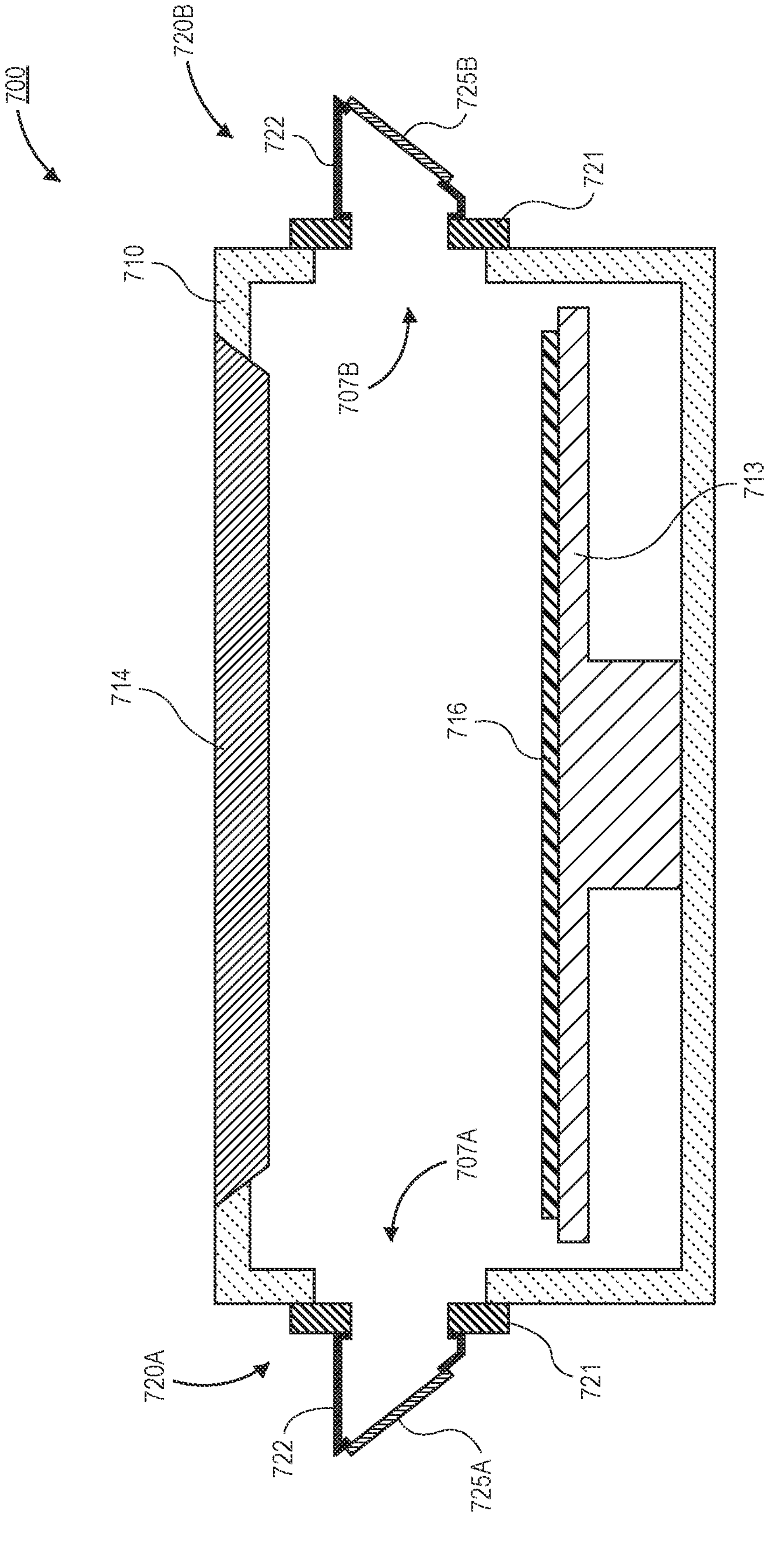
FIG. 7 is a semiconductor manufacturing tool that includes windows to enable high efficiency multi-pass absorption spectroscopy, in accordance with an embodiment.

Referring now to FIG. 7, a cross-sectional illustration of a tool 700 is shown, in accordance with an embodiment. In an embodiment, the tool 700 may comprise a chamber 710. The chamber 710 may include a lid 714 to seal the top of the chamber 710. Openings 707A and 707B may be provided along sidewalls of the chamber. The openings 707A and 707B may be sealed by window assemblies 720A and 720B, respectively. In an embodiment, the tool 700 may include a support 713 (e.g., an electrostatic chuck (ESC)) for supporting and securing a substrate 716. The chamber 710 may be used for an annealing process, a deposition process, an etching process, or the like. In some embodiments, the chamber 710 may be suitable for supporting a plasma within the chamber 710.

The window assemblies 720A and 720B may include a seal 721, a window support 722, and a window 725A or 725B. The window assemblies 720A and 720B provide fluid communication between the interior surface of the windows 725A and 725B and the internal volume of the chamber 710. The window assemblies 720A and 720B should, therefore, be capable of support sub-atmospheric pressures including vacuum or near vacuum pressures. In some instances, the windows 725A and 725B may be considered as "sealing" the openings 707A and 707B, or providing a "seal" for the openings 707A and 707B. As shown, such terminology does not require that the windows 725A and 725B be directly over the openings 707A and 707B or in contact with the chamber 710. Instead, one or more intervening components may separate the windows 725 from the openings 707.

In an embodiment, the window assemblies 720A and 720B orient the windows 725A and 725B at an angle relative to the sidewalls of the chamber 710. This allows for an optical path that passes horizontally through the chamber to interface with the windows 725A and 725B at (or around) the Brewster's angle in order to minimize (or eliminate) reflections.

In the embodiment illustrated in FIG. 7, the windows 725 are angled. Though in other embodiments, the windows 725 may be parallel to sidewalls of the chamber, and the mirrors (not shown in FIG. 7) may be angled. In yet another embodiment, both the mirrors and windows 725 may be angled relative to the chamber 710. More generally, any of the embodiments described in greater detail herein can be implemented using structures and components similar to those shown and described with respect to FIG. 7.

Figure 8:
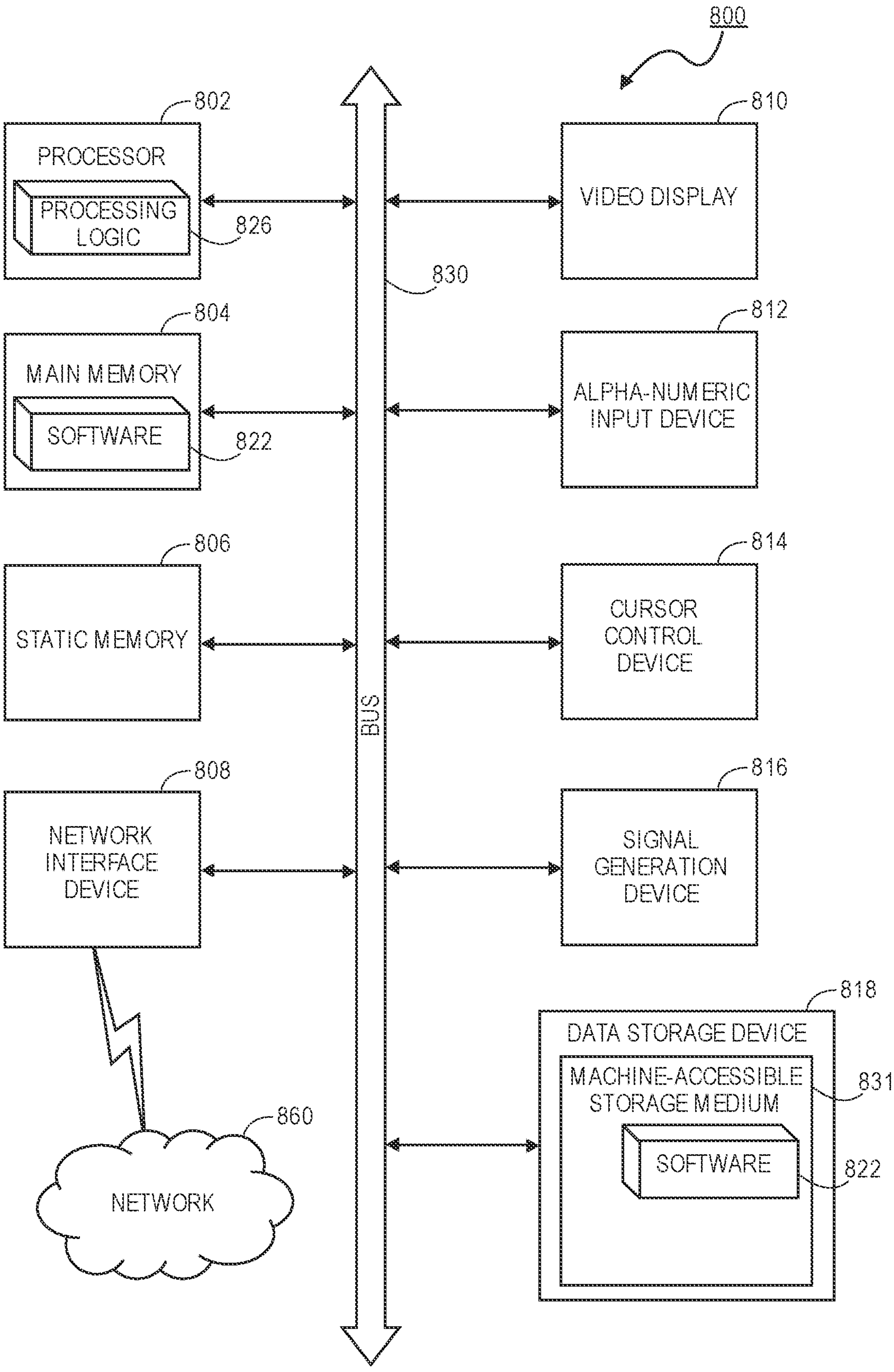
FIG. 8 illustrates a block diagram of an exemplary computer system that may be used in conjunction with a processing tool, in accordance with an embodiment.

Referring now to FIG. 8, a block diagram of an exemplary computer system 800 of a processing tool with a multi-pass absorption spectroscopy system integrated with a chamber is illustrated in accordance with an embodiment. In an embodiment, computer system 800 is coupled to and controls processing in the processing tool. Computer system 800 may be connected (e.g., networked) to other machines in a Local Area Network (LAN), an intranet, an extranet, or the Internet. Computer system 800 may operate in the capacity of a server or a client machine in a client-server network environment, or as a peer machine in a peer-to-peer (or distributed) network environment. Computer system 800 may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated for computer system 800, the term "machine" shall also be taken to include any collection of machines (e.g., computers) that individually or jointly execute a set (or multiple sets) of instructions to perform any one or more of the methodologies described herein.

Computer system 800 may include a computer program product, or software 822, having a non-transitory machine-readable medium having stored thereon instructions, which may be used to program computer system 800 (or other electronic devices) to perform a process according to embodiments. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., infrared signals, digital signals, etc.)), etc.

In an embodiment, computer system 800 includes a system processor 802, a main memory 804 (e.g., read-only memory (ROM), flash memory, dynamic random access memory (DRAM) such as synchronous DRAM (SDRAM) or Rambus DRAM (RDRAM), etc.), a static memory 806 (e.g., flash memory, static random access memory (SRAM), etc.), and a secondary memory 818 (e.g., a data storage device), which communicate with each other via a bus 830.

System processor 802 represents one or more general-purpose processing devices such as a microsystem processor, central processing unit, or the like. More particularly, the system processor may be a complex instruction set computing (CISC) microsystem processor, reduced instruction set computing (RISC) microsystem processor, very long instruction word (VLIW) microsystem processor, a system processor implementing other instruction sets, or system processors implementing a combination of instruction sets. System processor 802 may also be one or more special-purpose processing devices such as an application specific integrated circuit (ASIC), a field programmable gate array (FPGA), a digital signal system processor (DSP), network system processor, or the like. System processor 802 is configured to execute the processing logic 826 for performing the operations described herein.

The computer system 800 may further include a system network interface device 808 for communicating with other devices or machines. The computer system 800 may also include a video display unit 810 (e.g., a liquid crystal display (LCD), a light emitting diode display (LED), or a cathode ray tube (CRT)), an alphanumeric input device 812 (e.g., a keyboard), a cursor control device 814 (e.g., a mouse), and a signal generation device 816 (e.g., a speaker).

The secondary memory 818 may include a machine-accessible storage medium 832 (or more specifically a computer-readable storage medium) on which is stored one or more sets of instructions (e.g., software 822) embodying any one or more of the methodologies or functions described herein. The software 822 may also reside, completely or at least partially, within the main memory 804 and/or within the system processor 802 during execution thereof by the computer system 800, the main memory 804 and the system processor 802 also constituting machine-readable storage media. The software 822 may further be transmitted or received over a network 860 via the system network interface device 808. In an embodiment, the network interface device 808 may operate using RF coupling, optical coupling, acoustic coupling, or inductive coupling.

While the machine-accessible storage medium 832 is shown in an exemplary embodiment to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine to perform any one or more of the methodologies. The term "machine-readable storage medium" shall accordingly be taken to include, but not be limited to, solid-state memories, and optical and magnetic media.

In the foregoing specification, specific exemplary embodiments have been described. It will be evident that various modifications may be made thereto without departing from the scope of the following claims. The specification and drawings are, accordingly, to be regarded in an illustrative sense rather than a restrictive sense.

What is claimed is:

1. An apparatus, comprising:
- a chamber with a first opening and a second opening;
- a first window that seals the first opening;
- a first concave mirror outside of the chamber, wherein the first window and the first concave mirror are oriented in a non-parallel arrangement with each other;
- a second window that seals the second opening, wherein a face of the first window is oriented parallel to a face of the second window; and
- a second concave mirror outside of the chamber, wherein the second window and the second concave mirror are oriented in a non-parallel arrangement with each other, and wherein the first concave mirror is parallel to the second concave mirror.

2. The apparatus of claim 1, wherein the first window and the second window are oriented as concave mirror images of each other.

3. The apparatus of claim 1, wherein light reflected between the first concave mirror and the second concave mirror passes through the first window and the second window at an angle between 45° and 80° from normal.

4. The apparatus of claim 3, wherein the angle is the Brewster's angle.

5. The apparatus of claim 1, wherein the first window and the second window are oriented parallel to a sidewall of the chamber.

6. The apparatus of claim 1, wherein the first window and the second window are non-parallel with a sidewall of the chamber.

7. The apparatus of claim 1, further comprising:
- a laser source configured to emit laser light that reflects between the first concave mirror and the second concave mirror; and
- a detector configured to detect laser light that has reflected between the first concave mirror and the second concave mirror at least one time.

8. The apparatus of claim 7, wherein the laser source is configured to emit the laser light through the first concave mirror, and wherein the detector is configured to detect the laser light after the laser light passes through the first concave mirror after reflecting between the first concave mirror and the second concave mirror.

9. The apparatus of claim 7, wherein the laser source is configured to emit the laser light through the first concave mirror, and wherein the detector is configured to detect the laser light after the laser light passes through the second concave mirror after reflecting between the first concave mirror and the second concave mirror.

10. The apparatus of claim 7, wherein the laser source is configured to emit the laser light in a path toward the second concave mirror that passes outside an outer edge of the first concave mirror, and wherein the detector is configured to detect the laser light after is passes outside an outer edge of the second concave mirror.

11. An apparatus, comprising:
- a chamber; and
- an absorption spectroscopy system configured to take measurements within the chamber, wherein the absorption spectroscopy system comprises:
  - a first concave mirror outside of the chamber; and
  - a second concave mirror outside of the chamber, wherein an optical path between the first concave mirror and the second concave mirror passes through a first window of the chamber and a second window of the chamber, and wherein a face of the first window is oriented parallel to a face of the second window.

12. The apparatus of claim 11, wherein the optical path intersects the first window and the second window at an angle between 45° and 80° from normal.

13. The apparatus of claim 12, wherein the angle is the Brewster's angle.

14. The apparatus of claim 11, wherein the chamber is an annealing chamber, a chemical vapor deposition chamber, a physical vapor deposition chamber, an atomic layer deposition chamber, or an etching chamber.

15. An apparatus, comprising:
- a vacuum chamber with a first window and a second window, wherein an optical path between the first window and the second window passes through a volume of the chamber;
- a first concave mirror and a second concave mirror, wherein the first concave mirror and the second concave mirror are outside of the vacuum chamber, wherein the first concave mirror and the second concave mirror are configured to reflect light along the optical path through the volume of the chamber, and wherein faces of the first window and the second window are non-parallel with faces of the first concave mirror and the second concave mirror, and wherein the face of the first window is oriented parallel to the face of the second window.

16. The apparatus of claim 15, wherein the optical path is substantially orthogonal to a sidewall of the chamber.

17. The apparatus of claim 15, wherein the first concave mirror and the second concave mirror are coated with gold.

18. The apparatus of claim 15, wherein the optical path passes through the first window and the second window at the Brewster's angle.

* * * * *